US010841366B2

United States Patent
Zhang et al.

(10) Patent No.: US 10,841,366 B2
(45) Date of Patent: Nov. 17, 2020

(54) SERVICE GRAPH BASED SERVERLESS CLOUD PLATFORM

(71) Applicant: Futurewei Technologies, Inc., Plano, TX (US)

(72) Inventors: Hong Zhang, Palo Alto, CA (US); Farhad P. Sunavala, San Ramon, CA (US); Henry Louis Fourie, Livermore, CA (US)

(73) Assignee: Futurewei Technologies, Inc., Plano, TX (US)

( * ) Notice: Subject to any disclaimer, the term of this patent is extended or adjusted under 35 U.S.C. 154(b) by 230 days.

(21) Appl. No.: 15/923,989

(22) Filed: Mar. 16, 2018

(65) Prior Publication Data

US 2018/0270301 A1    Sep. 20, 2018

Related U.S. Application Data

(60) Provisional application No. 62/473,973, filed on Mar. 20, 2017.

(51) Int. Cl.
*H04L 29/08* (2006.01)
*H04L 12/24* (2006.01)
(Continued)

(52) U.S. Cl.
CPC ............ *H04L 67/1002* (2013.01); *G06F 9/44* (2013.01); *H04L 41/08* (2013.01);
(Continued)

(58) Field of Classification Search
CPC .................................................. H04L 67/1002
See application file for complete search history.

(56) References Cited

U.S. PATENT DOCUMENTS 9,110,844 B2 *   8/2015   Alnoor ...................... G06F 9/54
9,459,925 B2    10/2016   Lawson et al.
(Continued)

FOREIGN PATENT DOCUMENTS

EP          0662651 A2       7/1995
WO    WO-2017005329 A1       1/2017

OTHER PUBLICATIONS

"European Application No. 18772012.3, Extended European Search Report dated Mar. 20, 2019", (Mar. 20, 2019), 10 pgs.
(Continued)

*Primary Examiner* — Adnan M Mirza
(74) *Attorney, Agent, or Firm* — Schwegman Lundberg & Woessner, P.A.

(57) ABSTRACT

An architecture, method, and/or non-transitory computer-readable media provide a service graph based serverless cloud architecture. The service graphs can orchestrate cloud-hosted functions into a coordinated micro-service application, and thus control the execution of the cloud-hosted functions in a prescribed manner. Additionally, service graphs permit a user to arrange cloud-hosted functions to execute in sequence or concurrently, manage error conditions by re-invoking function calls, handle scaling to accommodate varying event loads, and the like. Service graphs also allow a user to define rendezvous points (i.e., states) to wait for pre-defined events before executing a cloud-hosted function and progressing through the service graph. The advantages of coordinating the execution of cloud-hosted functions with service graphs is that the service graphs provide a consistent framework for managing cloud-hosted functions without the user having to solve the coordination problems on their own.

15 Claims, 11 Drawing Sheets

(51) Int. Cl.
  *G06F 9/44*   (2018.01)
  *G06F 9/50*   (2006.01)
  *G06F 9/448*  (2018.01)
  *G06F 9/54*   (2006.01)

(52) U.S. Cl.
  CPC ........ *H04L 41/5041* (2013.01); *G06F 9/4498* (2018.02); *G06F 9/5027* (2013.01); *G06F 9/5077* (2013.01); *G06F 9/542* (2013.01)

(56) References Cited

U.S. PATENT DOCUMENTS

| | | |
|---|---|---|
| 2011/0302302 A1 | 12/2011 | Min et al. |
| 2012/0209968 A1 | 8/2012 | Lawson et al. |
| 2013/0211870 A1 | 8/2013 | Lawson et al. |
| 2014/0059209 A1 | 2/2014 | Alnoor |
| 2018/0196702 A1* | 7/2018 | Artusio ................ G06F 9/5044 |

OTHER PUBLICATIONS

McGrath, Garrett, et al., "Cloud Event Programming Paradigms: Applications and Analysis", 2016 IEEE 9th International Conference on Cloud Computing, (Jun. 27, 2016), 400-406.
"International Application Serial No. PCT/CN2018/079583, International Search Report dated Jun. 21, 2018", 4 pgs.
"International Application Serial No. PCT/CN2018/079583, Written Opinion dated Jun. 21, 2018", 4 pgs.
"Chinese Application No. 201880017081.2, First Office Action dated Mar. 9, 2020", (Mar. 9, 2020), 17 pgs.
European Application No. 18772012.3, Result of Consultation dated Jun. 9, 2020, 3 pgs.

* cited by examiner

US 10,841,366 B2

SERVICE GRAPH BASED SERVERLESS CLOUD PLATFORM

RELATED APPLICATION(S)

This application claims priority to U.S. Provisional Patent Application No. 62/473,973, filed Mar. 20, 2017, the entire contents of which are incorporated herein by reference.

FIELD OF THE INVENTION

The present disclosure relates to a serverless cloud architecture, and more particularly to execution of functions based on a service graph within the serverless cloud architecture.

BACKGROUND

The "cloud" is an abstraction that relates to resource management over a network and, more specifically, to a data center architecture that provides a platform for delivering services via a network. For example, the cloud may refer to various services delivered over the Internet such as network-based storage services or compute services. Typical cloud architecture deployments include a layered hierarchy that includes a physical layer of network hardware, and one or more software layers that enable users to access the network hardware. For example, one common type of cloud architecture deployment includes a physical layer of network resources (e.g., servers, storage device arrays, network switches, etc.) accompanied by a multi-layered hierarchical software framework that includes a first layer that implements Infrastructure as a Service (IaaS), a second layer that implements Platform as a Service (PaaS), and a third layer that implements Software as a Service (SaaS). In general, although there may be exceptions, resources in the third layer are dependent on resources in the second layer, resources in the second layer are dependent on resources in the first layer, and resources in the first layer are dependent on resources in the physical layer.

More recently, a serverless cloud architecture has been developed that enables users to execute functions in the cloud without provisioning resources in the traditional hierarchical structure described above. For example, Amazon Web Services (AWS) has developed a service referred to as Amazon® AWS Lambda that enables users to run code without provisioning or managing servers to run the code, like in a traditional compute service. Consequently, a web application can be developed that calls functions uploaded to the AWS Lambda service, where compute resources to execute the function are managed and provisioned by Amazon rather than the web application.

However, there are problems with this type of serverless architecture. This architecture is useful for executing particular functions, which can be called a number of times from many different clients, and the resources for handling these function calls are provisioned automatically, enabling scaling to fit dynamic traffic. However, this architecture is not suited for calling multiple functions in a row. Amazon has recently developed another service called AWS Step Functions that can be utilized with AWS Lambda to coordinate the execution of multiple functions. In effect, AWS Step Functions enables a user to define a workflow to coordinate the order and execution of multiple functions. Functions can be delayed in execution until another function has completed, or even delayed for a set time period. However, the function execution enabled by AWS Step Functions cannot be triggered by complex events, and is therefore limited in function as to the complexity of applications or processes that can be built using this service. There is a need to develop a more diverse platform for executing functions in a serverless architecture similar to AWS Lambda.

SUMMARY

A serverless cloud architecture is provided. The serverless cloud architecture comprises a service graph (SG) manager configured to receive a state machine model specification that defines a state machine model, generate one or more service graph controllers (SGCs) configured to manage state machine instances (SMI) that implement the state machine model, generate a number of event mapping agents associated with one or more event sources. Each event mapping agent is configured to track events generated at the event sources and transmit notification of the events to the one or more SGCs. The serverless cloud architecture additionally comprises a function execution engine configured to execute a plurality of cloud-hosted functions on one or more nodes in response to function calls generated by the SMIs.

Also provided is a method for executing cloud-hosted functions in a serverless cloud architecture. The method comprises receiving, at a service graph manager, a state machine model specification that defines a state machine model. Additionally, the method comprises generating one or more service graph controllers (SGCs) configured to manage state machine instances (SMIs) that implement the state machine model. Further, the method comprises generating a number of event mapping agents associated with one or more event sources, where each event mapping agent is configured to track events generated at the event sources and transmit notification of the events to the one or more SGCs. Still yet, the method comprises executing a plurality of cloud-hosted functions on one or more nodes in response to function calls generated by the SMIs.

Further, a non-transitory computer-readable media is provided that stores computer instructions for executing cloud-hosted functions in a serverless cloud architecture that, when executed by one or more processors, cause the one or more processors to perform the steps. The steps include receiving, at a service graph manager, a state machine model specification that defines a state machine model. Additionally, the steps include generating one or more service graph controllers (SGCs) configured to manage state machine instances (SMIs) that implement the state machine model. Further, the steps include generating a number of event mapping agents associated with one or more event sources, wherein each event mapping agent is configured to track events generated at the event sources and transmit notification of the events to the one or more SGCs. Still yet, the steps include executing a plurality of cloud-hosted functions on one or more nodes in response to function calls generated by the SMIs.

Optionally, in any of the preceding embodiments, a representation of the state machine model is based on a service graph language, wherein the state machine model comprises states, actions, and events defined in a hierarchical structure. As another option, the actions include invoking a function call of a cloud-hosted function executed by the function execution engine. As yet another option, the events include at least one of file events, table events, and protocol events. As still yet another option, the service graph language comprises javascript object notation (JSON) representation of the state machine model.

Optionally, in any of the preceding embodiments, the service graph manager is configured to generate a service graph engine corresponding to a particular service graph, the service graph engine comprising: the one or more SGCs; a service graph scheduler in communication with the one or more SGCs; and one or more SMIs associated with each SGC in the one or more SGCs. As another option, each SGC in the one or more SGCs is hosted on a different node in a plurality of nodes, each node hosting one SGC and one or more SMIs associated with the SGC. As yet another option, the SG manager is configured to perform load balancing by adjusting a number of the one or more SGCs.

To this end, in some optional embodiments, one or more of the foregoing features of the aforementioned architecture, method, and/or non-transitory computer-readable media may provide a service graph based serverless cloud architecture. The service graphs can orchestrate cloud-hosted functions into a coordinated micro-service application, and thus control the execution of the cloud-hosted functions in a prescribed manner. Additionally, service graphs permit a user to arrange cloud-hosted functions to execute in sequence or concurrently, manage error conditions by re-invoking function calls, handle scaling to accommodate varying event loads, and the like. Service graphs also allow a user to define rendezvous points (i.e., states) to wait for pre-defined events before executing a cloud-hosted function and progressing through the service graph. The advantages of coordinating the execution of cloud-hosted functions with service graphs is that the service graphs provide a consistent framework for managing cloud-hosted functions without the user having to solve the coordination problems on their own. It should be noted that the aforementioned potential advantages are set forth for illustrative purposes only and should not be construed as limiting in any manner.

DETAILED DESCRIPTION

Service graphs orchestrate cloud-hosted functions into a coordinated micro-service application. Service graphs represent a state machine model driven by events from a wide variety of sources that control the execution of the cloud-hosted functions in a prescribed manner. Service graphs permit a user to arrange cloud-hosted functions to execute in sequence or concurrently, manage error conditions by re-invoking function calls, handle scaling to accommodate varying event loads, and the like. A service graph controller allows for the instantiation and dispatch of multiple state machine instances, which implement a state machine model as defined by a service graph.

Service graphs also allow a user to define rendezvous points (i.e., states) to wait for pre-defined events before executing a cloud-hosted function and progressing through the service graph. The advantages of coordinating the execution of cloud-hosted functions with service graphs is that the service graphs provide a consistent framework for managing cloud-hosted functions without the user having to solve the coordination problems on their own.

Figure 1A:
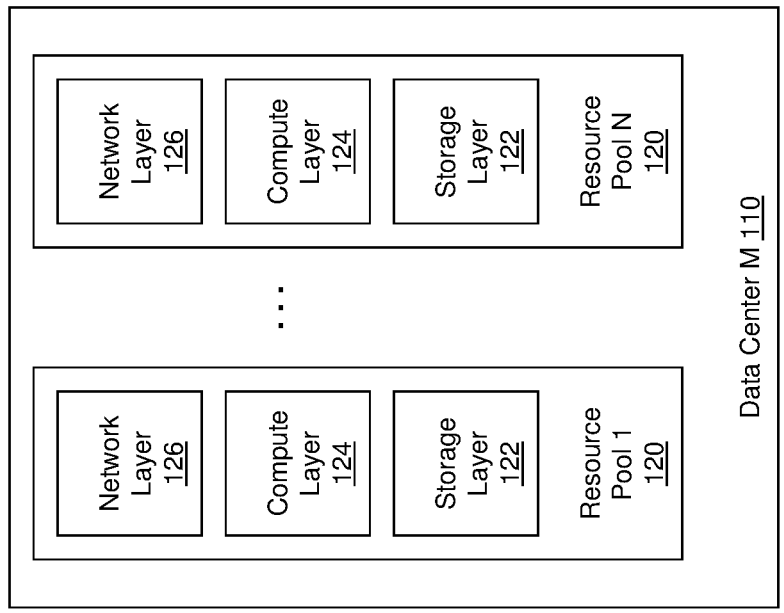
FIGS. 1A and 1B illustrate the infrastructure for implementing a cloud, in accordance with the prior art.
Figure 1A:
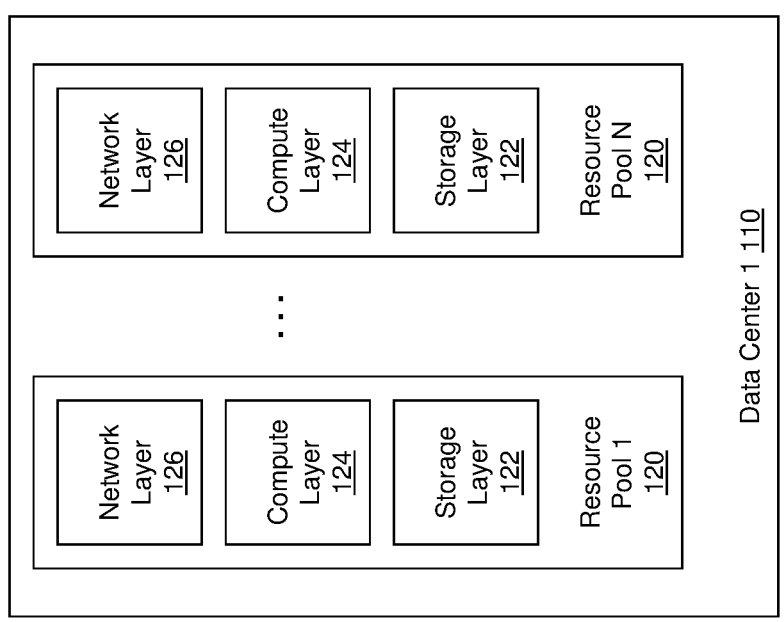
Figure 1B:
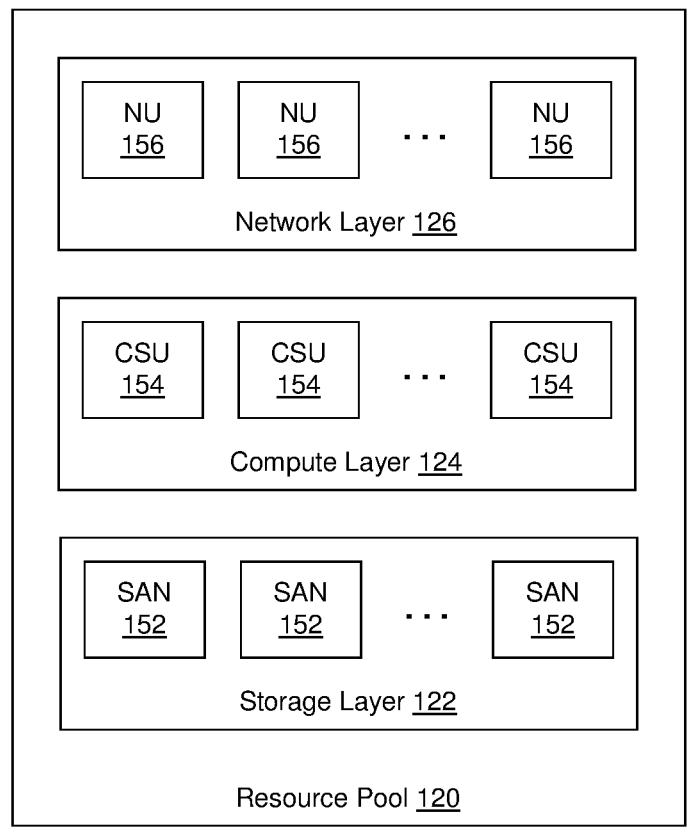

FIGS. 1A and 1B illustrate the infrastructure for implementing a cloud 100, in accordance with the prior art. The cloud 100, as used herein, refers to the set of hardware resources (compute, storage, and networking) located in one or more data centers (i.e., physical locations) and the software framework to implement a set of services across a network, such as the Internet. As shown in FIG. 1A, the cloud 100 includes a plurality of data centers 110, each data center 110 in the plurality of data centers 110 including one or more resource pools 120. A resource pool 120 includes a storage layer 122, a compute layer 124, and a network layer 126.

As shown in FIG. 1B, the storage layer 122 includes the physical resources to store instructions and/or data in the cloud 100. The storage layer 122 includes a plurality of storage area networks (SAN) 152, each SAN 152 provides access to one or more block level storage devices. In one embodiment, a SAN 152 includes one or more non-volatile storage devices accessible via the network. Examples of non-volatile storage devices include, but are not limited to, hard disk drives (HDD), solid state drives (SSD), flash memory such as an EEPROM or Compact Flash (CF) Card, and the like. In another embodiment, a SAN 152 is a RAID (Redundant Array of Independent Disks) storage array that combines multiple, physical disk drive components (e.g., a number of similar HDDs) into a single logical storage unit. In yet another embodiment, a SAN 152 is a virtual storage resource that provides a level of abstraction to the physical storage resources such that a virtual block address may be used to reference data stored in one or more corresponding blocks of memory on one or more physical non-volatile storage devices. In such an embodiment, the storage layer 122 may include a software framework, executed on one or more processors, for implementing the virtual storage resources.

The compute layer 124 includes the physical resources to execute processes (i.e., sets of instructions) in the cloud 100. The compute layer 124 may include a plurality of compute scale units (CSU) 154, each CSU 154 including at least one processor and a software framework for utilizing the at least one processor. In one embodiment, a CSU 154 includes one or more servers (e.g., blade servers) that provide physical hardware to execute sets of instructions. Each server may include one or more processors (e.g., CPU(s), GPU(s), ASIC(s), FPGA(s), DSP(s), etc.) as well as volatile memory for storing instructions and/or data to be processed by the one or more processors. The CSU 154 may also include an operating system, loaded into the volatile memory and executed by the one or more processors, that provides a runtime environment for various processes to be executed on the hardware resources of the server. In another embodiment, a CSU 154 is a virtual machine that provides a collection of virtual resources that emulate the hardware resources of a server. The compute layer 124 may include a hypervisor or virtual machine monitor that enables a number of virtual machines to be executed substantially concurrently on a single server.

The networking layer 126 includes the physical resources to implement networks. In one embodiment, the networking layer 126 includes a number of switches and/or routers that enable data to be communicated between the different resources in the cloud 100. For example, each server in the compute layer 124 may include a network interface controller (NIC) coupled to a network interface (e.g., Ethernet). The interface may be coupled to a network switch that enables data to be sent from that server to another server connected to the network switch. The networking layer 126 may implement a number of layers of the OSI model, including the Data Link layer (i.e., layer 2), the Networking layer (i.e., layer 3), and the Transport layer (i.e., layer 4). In one embodiment, the networking layer 126 implements a virtualization layer that enables virtual networks to be established within the physical network. In such embodiments, each network unit (NU) 156 in the network layer 126 is a virtual private network (VPN).

It will be appreciated that each data center 110 in the plurality of data centers may include a different set of hardware resources and, therefore, a different number of resource pools 120. Furthermore, some resource pools 120 may exclude one or more of the storage layer 122, compute layer 124, and/or network layer 126. For example, one resource pool 120 may include only a set of servers within the compute layer 124. Another resource pool 120 may include both a compute layer 124 and network layer 126, but no storage layer 122.

Figure 2:
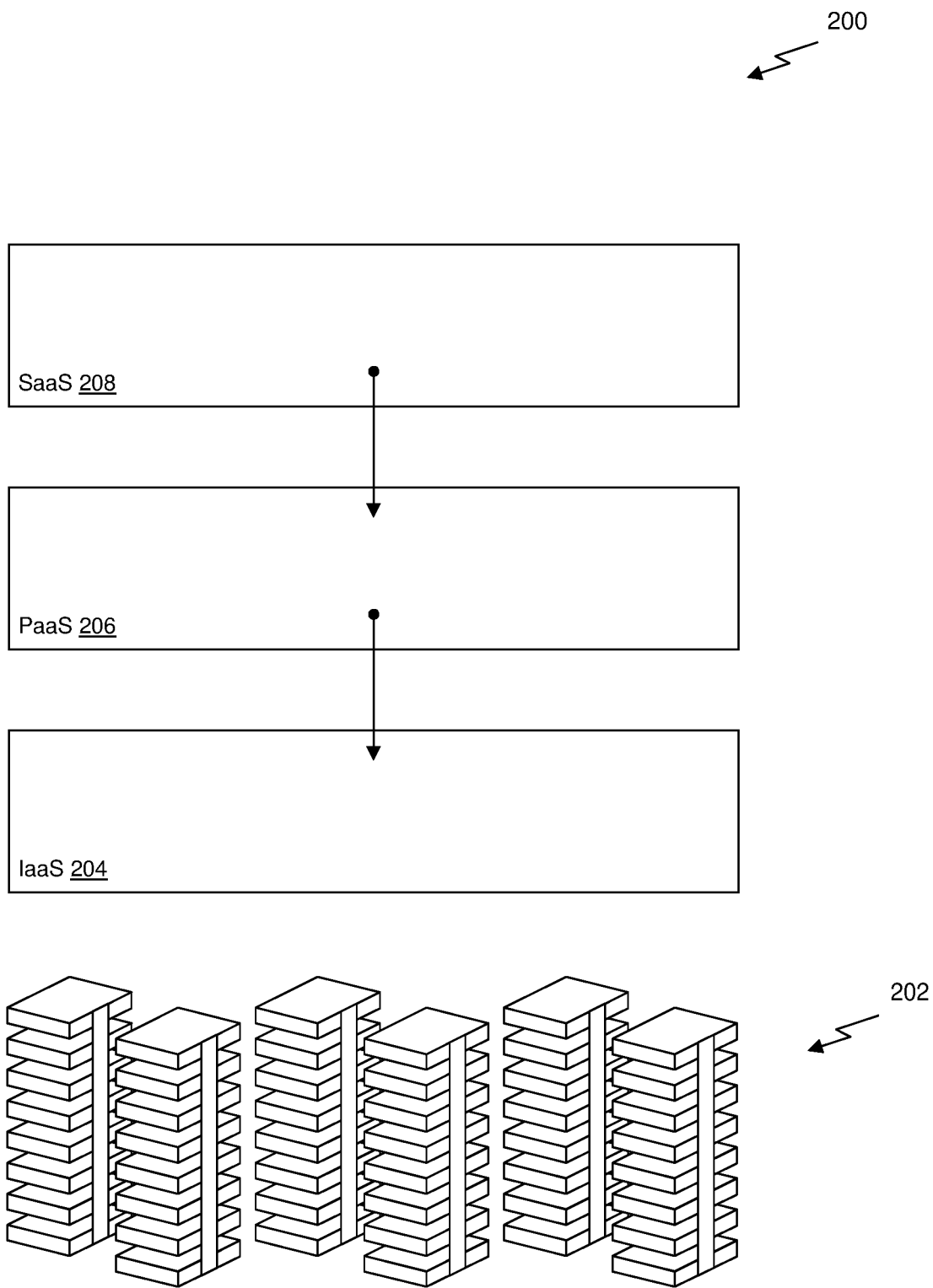
FIG. 2 is a conceptual illustration of a cloud architecture, in accordance with the prior art.

FIG. 2 is a conceptual illustration of a cloud architecture 200, in accordance with the prior art. As shown in FIG. 2, the cloud architecture 200 is represented as a plurality of hierarchical layers. The cloud architecture 200 includes a physical layer 202, an Infrastructure as a Service (IaaS) layer 204, a Platform as a Service (PaaS) layer 206, and a Software as a Service (SaaS) layer 208. The physical layer 202 is the collection of hardware resources that implement the cloud. In one embodiment, the physical layer 202 is implemented as shown in FIGS. 1A and 1B.

The IaaS layer 204 is a software framework that enables the resources of the physical layer 202 to be allocated to different infrastructure services. The IaaS layer 204 may include a software framework for managing and allocating resources in the physical layer 202. For example, the IaaS layer 204 may include a software engine for managing SANs 152 in the storage layer 122 of the physical layer 202. The software engine may also manage CSUs 154 in the compute layer 124 of the physical layer 202. Services in the PaaS layer 206 or the SaaS layer 208 may request the allocation of services in the IaaS layer 204 to run a task. For example, a cluster service in the PaaS layer 206 may request the allocation of a number of virtual machines from the IaaS layer 204, which implements the virtual machines on one or more CSUs 154.

It will be appreciated that the cloud architecture 200 shown in FIG. 2 is only one type of architecture framework implemented in conventional clouds. However, other cloud architectures may implement different frameworks. For example, a cloud architecture may include the IaaS layer 204 and the SaaS layer 208 without any intervening PaaS layer 206. In another example, a cloud architecture may include a Container as a Service (CaaS) layer (i.e., a new way of resource virtualization without IaaS and PaaS) plus an SaaS layer on top of the CaaS layer. In each instance, these cloud architectures employ a resource dependence scheme for requesting resources on which to run the service.

Figure 3:
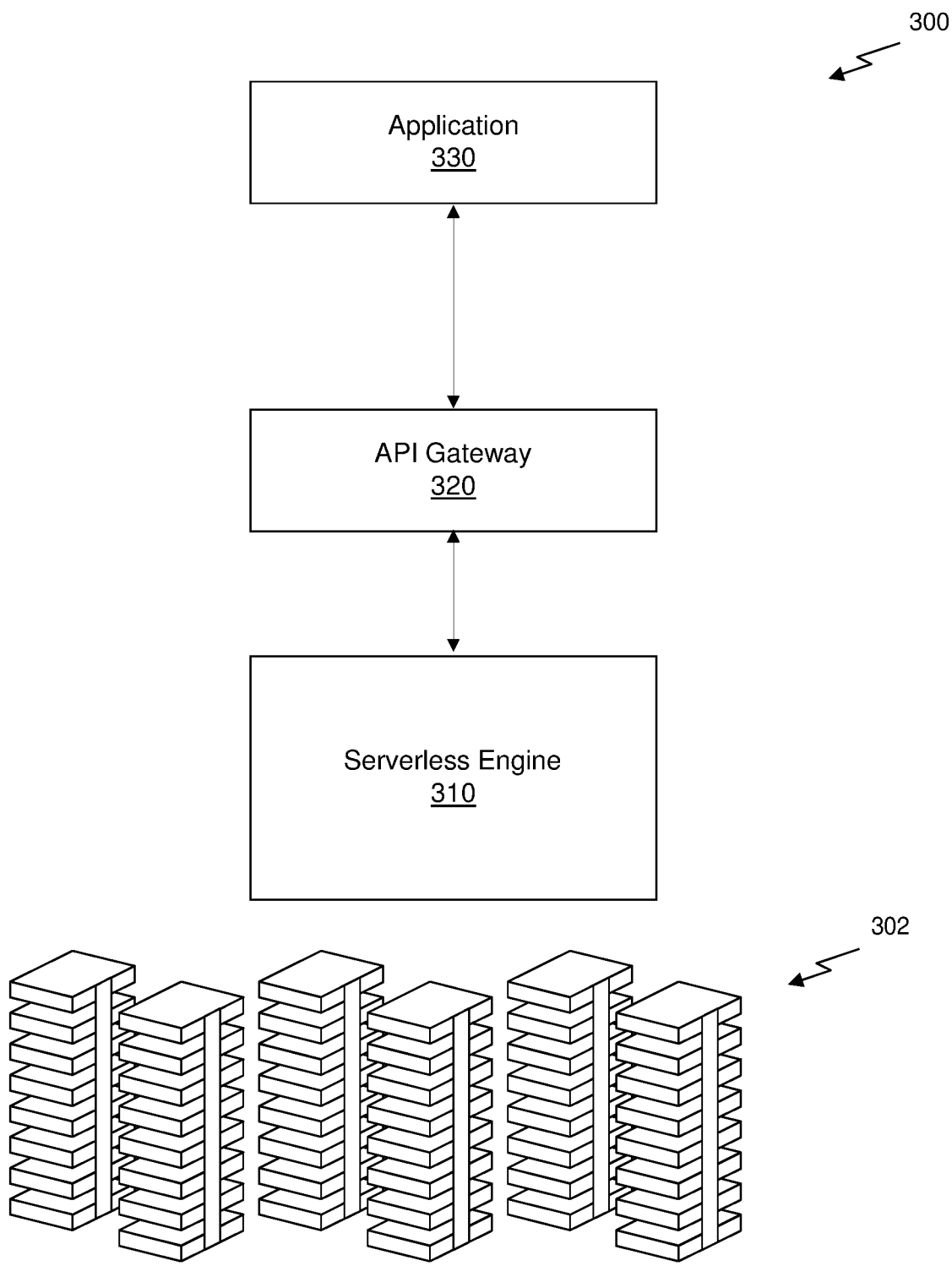
FIG. 3 is a conceptual illustration of a serverless cloud architecture, in accordance with the prior art.

FIG. 3 is a conceptual illustration of a serverless cloud architecture 300, in accordance with the prior art. As shown in FIG. 3, the serverless cloud architecture 300 does not have the same hierarchical structure as a traditional cloud architecture, as shown in FIG. 2. The physical layer 302 is the collection of hardware resources that implement the cloud. In one embodiment, the physical layer 302 is implemented as shown in FIGS. 1A and 1B.

The serverless cloud architecture 300 includes a serverless engine 310 which manages the execution of functions using the hardware resources of the physical layer 302. In one embodiment, the serverless engine 310 includes a hypervisor that manages one or more virtual machines executed on resources in the physical layer 302. The serverless engine 310 runs software on each virtual machine that includes one or more containers for executing various functions. The serverless engine 310 is configured to execute the functions based on function calls received from an API Gateway 320.

An application 330 may call a function by making a function call. In one embodiment, a function call is implemented by making a RESTful API call to an endpoint associated with the API Gateway 320. As is known in the art, standard Hypertext Transfer Protocol (HTTP) methods may be used with a Uniform Resource Locator (URL) to specify a function identified by the URL. The API Gateway 320 may receive function calls from the application 330, which triggers the execution of the corresponding function by the serverless engine 310.

It will be appreciated that the term serverless does not refer to the fact that the cloud architecture 300 does not include servers, but rather the term serverless refers to the fact that the function caller does not need to provision server resources for executing the function as the provisioning is handled by the serverless engine 310. Furthermore, it will be appreciated that the serverless engine 310 may be built upon conventional cloud architectures such that the provisioning of virtual machines, for example, utilizes conventional services in the IaaS layer 204 or PaaS layer 206.

Figure 4A:
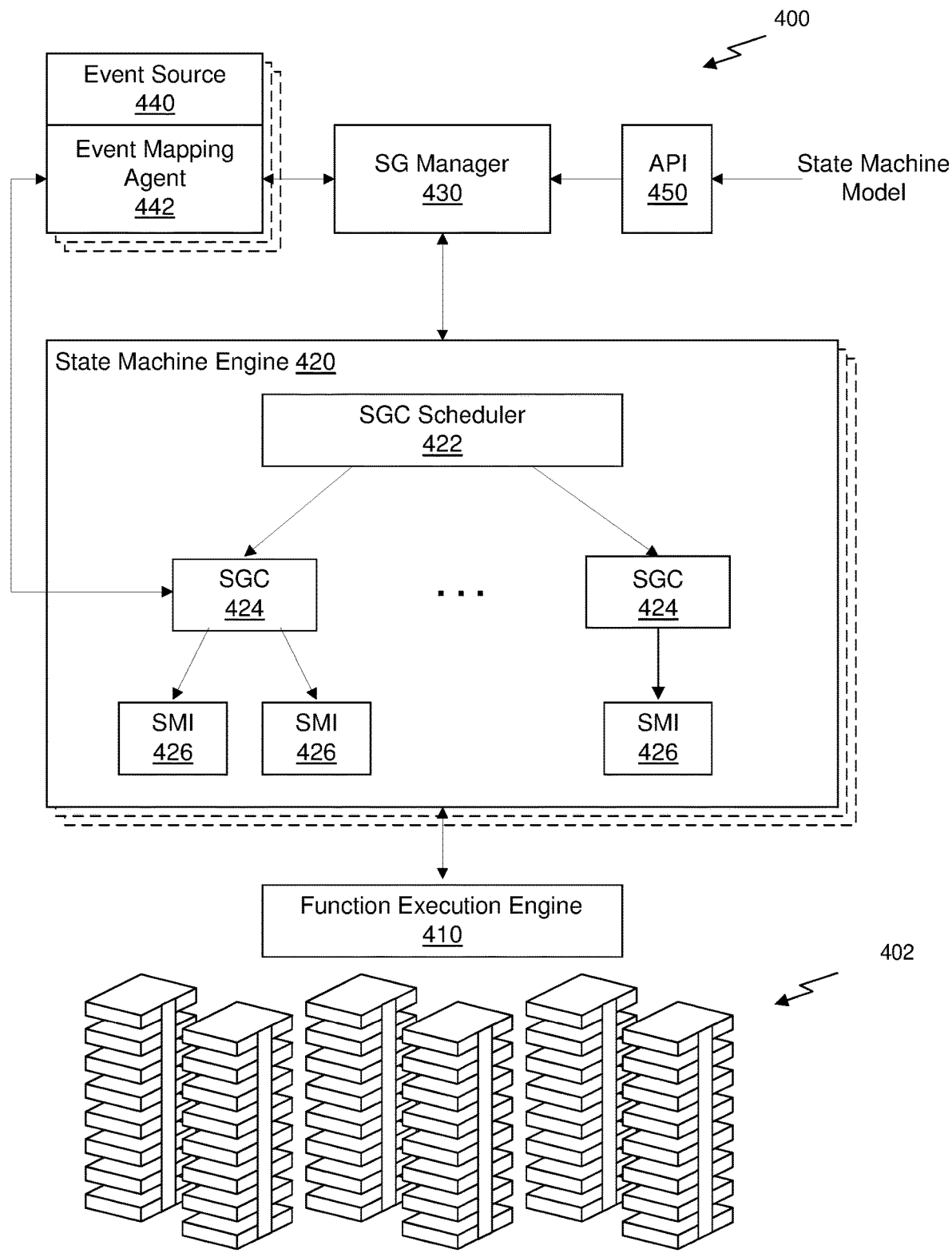
FIG. 4A is a conceptual illustration of a serverless cloud architecture, in accordance with one embodiment.

FIG. 4A is a conceptual illustration of a serverless cloud architecture 400, in accordance with one embodiment. As shown in FIG. 4A, the serverless cloud architecture 400 does not have the same hierarchical structure as a traditional cloud architecture, as shown in FIG. 2. The physical layer 402 is the collection of hardware resources that implement the cloud. In one embodiment, the physical layer 402 is implemented as shown in FIGS. 1A and 1B.

The serverless cloud architecture 400 is configured to enable execution of a plurality of cloud-hosted functions based on a state machine model that transitions in response to events. A representation of the state machine model may be may be based on a service graph language. For example, the state machine model may be defined using a service graph, which is a file that includes a representation of the state machine model written in a service graph language. The state machine model comprises states, actions, and events defined in a hierarchical structure. The actions may include function invocation, payload processing, holding for a delay period, transitioning to a next state, or termination of the state machine. In one embodiment, the service graph language is a JSON representation of a state machine model.

In another embodiment, the service graph language is a proprietary language having a syntax for defining the state machine model.

The serverless cloud architecture 400 includes a function execution engine 410, a service graph engine 420, a service graph (SG) manager 430, and one or more event sources 440. The function execution engine 410 manages the provisioning of resources in the physical layer 402 to execute cloud-hosted functions. For example, the function execution engine 410 receives function calls from the service graph engine 420, provisions a container to handle the execution of the function(s), transfers payload data to the node in the cloud associated with the container, executes the function(s), and directs result payload data to a destination location. Functions may be written in a variety of languages (e.g., Java, Python, C++, etc.), which is compiled into binary executable or compiled at runtime, and executed in a container that isolates the function and resources allocated to the function from other functions.

The service graph engine 420 includes a service graph controller (SGC) scheduler 422, one or more service graph controllers (SGCs) 424, and one or more state machine instances (SMIs) 426 associated with each SGC 424. Each SGC 424 is configured to manage one or more state machine instances (SMI) 426, which implement a state machine model for a particular invocation of service graph. A service graph defined by a user may be invoked by a call included in a web-application. For example, a web-application may include an HTTP request associated with a URI corresponding with the service graph. In response to the HTTP request, a new SMI 426 will be created to implement the state machine model defined by the service graph for the web-application.

The SGC scheduler 422 is configured to provision as many SGCs 424 as necessary to handle the dynamic traffic associated with a particular service graph (i.e., a collection of functions associated with a web-application). As an example, a user creates a web-application that includes a call to the service graph. The user uploads the service graph definition to the cloud, which is parsed to create a state machine model specification. The service graph engine 420 is configured to provision and manage a number of SMIs 426 as clients load and execute the web-application on client machines thereby running code on the client machine that includes the call to the service graph. Each SGC 424 and a number of SMIs 426 may be hosted on a different node (i.e., server) in the cloud. The SGC scheduler 422 may manage the instantiation of the SGCs 424 on various nodes in response to the traffic generated by the web-application, scaling up and down the number of SGCs 424 as needed. In one embodiment, the SGC scheduler 422 for a particular service graph is provisioned with a particular URI that enables the web-application to make a call to the SGC scheduler 422 to execute a service graph micro-service. The SGC scheduler 422 creates a new SMI 426 to handle the call by transmitting a message to one of the SGCs 424. The SGC scheduler 422 may also pass a payload received from the web-application to the SMI 426 via the SGC 424 so that the SMI 426 can process the payload according to the service graph. Once the service graph has completed processing the payload, the SMI 426 transmits the result payload to the SGC scheduler 422 to be transmitted back to the web-application that made the call and the SMI 426 may be deleted.

The SG manager 430 invokes one or more service graph engines 420 on various nodes in the cloud. Each service graph engine 420 may be associated with a different service graph created by a plurality of different users for a plurality of different web-applications. Furthermore, the SG manager 430 may invoke multiple service graph engines 420 for a single service graph to scale up the serverless cloud architecture for extremely large web-applications. The SG manager 430 is a centralized logic module that performs load balancing and scales in and out the number of SGCs 424 for each service graph. The SG manager 430 receives service graphs via an API 450 that implements a state machine model specification. The service graph, as written in a particular service graph language, may be read by a parser and converted to a state machine model specification according to the API 450 in order to implement the state machine model via the SMIs 426.

The SG manager 430 is also configured to manage events. The cloud may include a number of event sources 440. Event sources 440 refer to any components in the cloud that are associated with events. Examples of event sources 440 include, but are not limited to, network storage devices, databases, API Gateways, and the like. Examples of events include, but are not limited to, a file event (e.g., storing an image on a cloud storage device), a table event (e.g., adding an entry to a database), or a protocol event (e.g., receiving an HTTP request at an API Gateway). Events may be used to trigger actions in states of the state machine model. In other words, an action may not be executed immediately when entering a particular state, but instead the action is only executed in response to the occurrence of one or more events after the state is entered.

In one embodiment, in order to monitor the events, the SG manager 430 creates an event mapping agent 442 in each event source 440 referenced by a service graph. The event mapping agent 442 is a software module that is configured to retrieve a mapping table of events-to-SGCs and set up a communication channel between the event source 440 and one or more SGCs 424. In one embodiment, the SG manager 430 generates a mapping table that correlates events with SGCs 424 based on the state machine model specification corresponding to a service graph. A particular state machine model specification is used to instantiate (i.e., configure) a particular service graph engine 420, which includes a number of SGCs 424. Each SGC 424 may be referenced using a particular uniform resource identifier (URI) that enables other components of the serverless cloud architecture 400 to communicate directly with the SGCs 424. Each event mapping agent 442 may then establish a TCP/IP connection with one or more SGCs 424 using the URIs corresponding with the SGCs 424. The event mapping agent 442 can then be configured by the SG manager 430 to detect one or more events in a corresponding event source 440. After detecting an event, the event mapping agent 442 then transmits a message directly to the one or more SGCs 424 corresponding with the event.

In an alternative embodiment, the event mapping agent 442 may be a centralized component that polls a plurality of different event sources 440 to detect events. The centralized event mapping agent 442 may then transmit messages related to the events to the one or more SGCs 424.

Each SMI 426 is configured to implement an instance of the state machine model. The SMI 426 is invoked and transitions to an initial state. The SMI 426 then runs, processing payload data while transitioning between states as defined by the state machine model. Actions in each state may be triggered in response to one or more events. Actions may include invoking a function call of a cloud-hosted function executed by the function execution engine 410. Actions may also be triggered when results are received from the cloud-hosted functions. Again, the state machine model implemented by the SMI 426 is used to coordinate execution of cloud-hosted functions in a micro-service application.

Figure 4B:
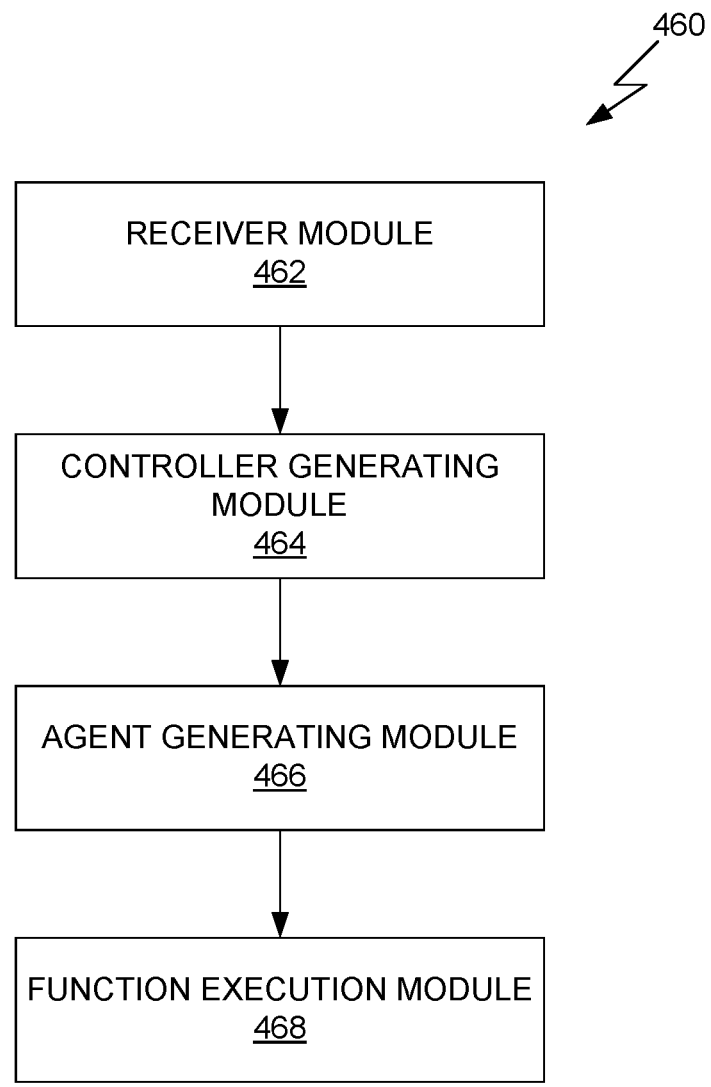
FIG. 4B is a conceptual illustration of a serverless cloud architecture, in accordance with another embodiment.

FIG. 4B is a conceptual illustration of a serverless cloud architecture 460, in accordance with another embodiment. As an option, the serverless cloud architecture 460 may be implemented with one or more features of any one or more of the embodiments set forth in any previous and/or subsequent figure(s) and/or the description thereof. For example, the serverless cloud architecture 460 may be implemented in the context of the serverless cloud architecture 400 of FIG. 4A. However, it is to be appreciated that the serverless cloud architecture 460 may be implemented in other suitable environments.

As shown, a receiver means in the form of a receiver module 462 is provided for receiving a state machine model specification that defines a state machine model. In various embodiments, the receiver module 462 may be component of, but is not limited to, the service graph manager 430 of FIG. 4A, at least one processor (to be described later) and any software controlling the same, and/or any other circuitry capable of the aforementioned functionality.

Also included is a controller generating means in the form of a controller generating module 464 in communication with the receiver module 462 for generating one or more service graph controllers (SGCs) configured to manage state machine instances (SMIs) that implement the state machine model. In various embodiments, the controller generating module 464 may be component of, but is not limited to, the service graph manager 430 of FIG. 4A, at least one processor (to be described later) and any software controlling the same, and/or any other circuitry capable of the aforementioned functionality.

With continuing reference to FIG. 4B, agent generating means in the form of a agent generating module 466 is in communication with the controller generating module 464 for generating a number of event mapping agents associated with one or more event sources, wherein each event mapping agent is configured to track events generated at the event sources and transmit notification of the events to the one or more SGCs. In various embodiments, the agent generating module 466 may be component of, but is not limited to the service graph manager 430 of FIG. 4A, at least one processor (to be described later) and any software controlling the same, and/or any other circuitry capable of the aforementioned functionality.

Further included is function execution means in the form of a function execution module 468 in communication with the agent generating module 466 for executing a plurality of cloud-hosted functions on one or more nodes in response to function calls generated by the SMIs. In various embodiments, the function execution module 468 may be component of, but is not limited to the function execution engine 410 of FIG. 4A, at least one processor (to be described later) and any software controlling the same, and/or any other circuitry capable of the aforementioned functionality.

Figure 5:
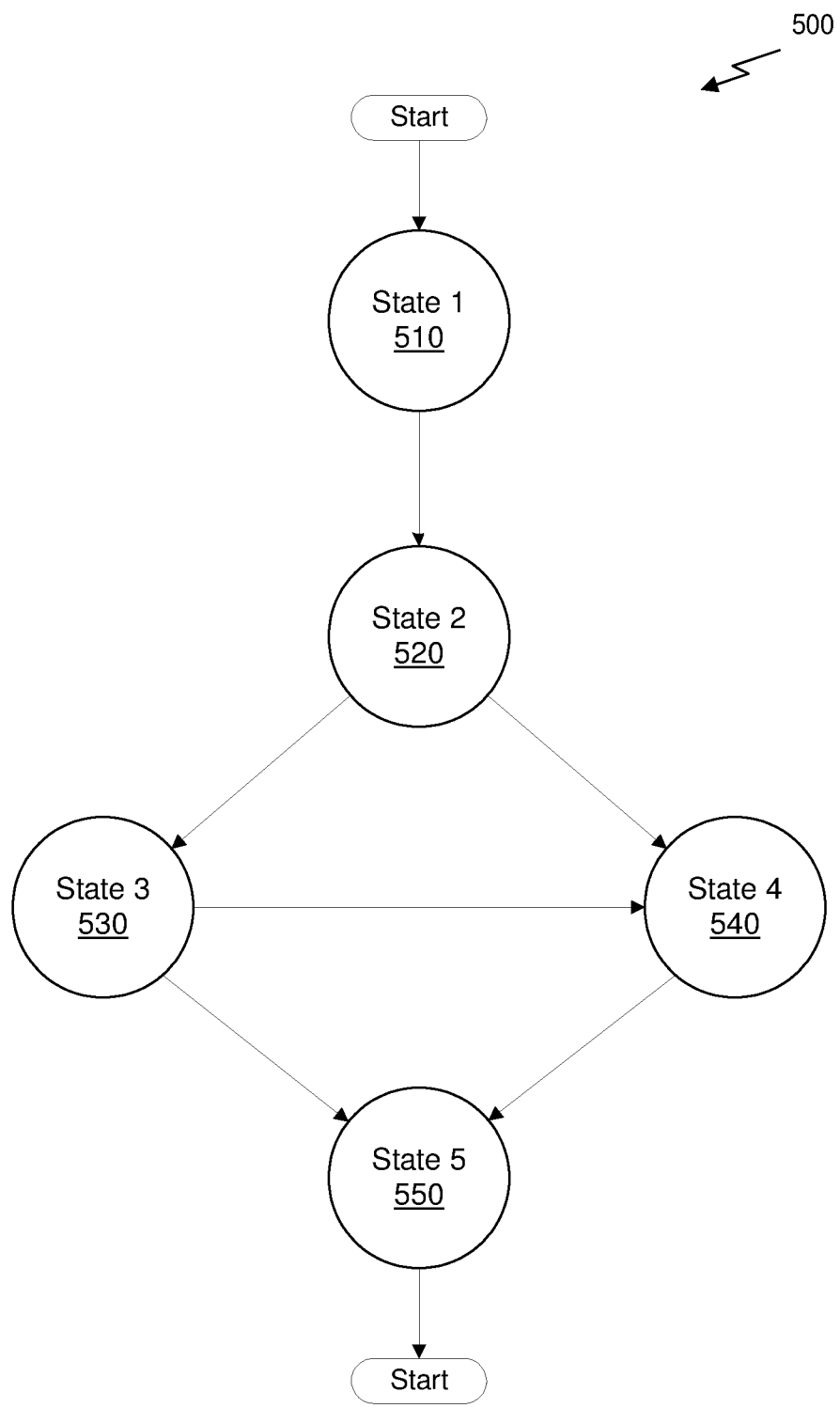
FIG. 5 is a conceptual diagram of a state machine model, in accordance with one embodiment.

FIG. 5 is a conceptual diagram of a state machine model 500, in accordance with one embodiment. It will be appreciated that the state machine model 500 of FIG. 5 is only provided as an example, and state machine models as defined by various users may include a different topology of states and transitions between states. As shown in FIG. 5, the state machine model 500 includes five states: a first state 510, a second state 520, a third state 530, a fourth state 540, and a fifth state 550. A call to invoke an instance of the state machine model 500 is received by the SG manager 430. The SG manager 430 may create event mapping agents in one or more event sources 440, as needed, based on any events associated with the states in the state machine model 500. In one embodiment, the call may be made in response to a client machine loading and running client-side code such as javascript that generates an HTTP request to a URL associated with the state machine model 500. The SG manager 430 is also configured to transmit a message to the SGC scheduler 422 to create a new instance of an SMI 426 corresponding to the call. The SGC scheduler 422 may direct one of the existing SGCs 424 or create a new SGC 424 to instantiate the new instance of the SMI 426. Once the SMI 426 corresponding to the call is running, the state machine enters the first state 510.

Each state can be associated with one or more actions. Actions may include calling a cloud-based function, processing a payload, delaying an action for a time period, transitioning to a next state, or termination of the state machine. Actions can be invoked when a state is entered, when one or more events have occurred, after a delay, when a result from a function call is received, after an error (e.g., a function call timeout), or on exiting the state. In many states, an action is invoked only after one or more events occur. Actions can be gated (i.e., blocked from execution) until multiple events occur (i.e., as combined with AND logic) or until any one of two or more events occur (i.e., as combined with OR logic). Again, notification of the occurrence of events is received at an SGC 424 from one or more event mapping agents 442.

As shown in FIG. 5, when an SMI 426 is created, the state machine model 500 enters an initial state, such as the first state 510. The first state 510 may define actions that are executed upon entry into the first state 510 or after one or more events have occurred. The first state 510 may also specify conditions for transitioning to another state. In one embodiment, the state machine model can transition to another state when a result is returned from a function specified by an action invoked within the state. In another embodiment, the state machine model can transition to another state based on the occurrence of one or more events.

The state machine model 500 shows one transition from the first state 510 to the second state 520. However, a single state may include logic for two or more transitions to different states as well. For example, a first transition can be defined from the second state 520 to the third state 530 in response to the occurrence of a first event, and a second transition can be defined from the second state 520 to a fourth state 540 in response to the occurrence of a second event. In other words, if the current state is the second state 520, then the next state of the state machine model will depend on the occurrence of specific events. As shown in FIG. 5, the third state 530 includes a first transition to the fourth state 540 and a second transition to the fifth state 550; the fourth state 540 includes a transition to the fifth state 550; and the fifth state 550 includes a transition to terminate the state machine model 500.

It will be appreciated that an SMI 426 is configured to implement the logic of a state machine model, calling functions in response to events, transitioning between states, processing payloads received from a client, one or more events, a result of an action, and so forth. In one embodiment, the SMI 426 is an object invoked using a state machine model specification as input in order to configure the SMI 426 to implement the state machine model defined by a the state machine model specification, which defines the states of the state machine model as well as the events and actions associated with each state and transitions between states.

Figure 6:
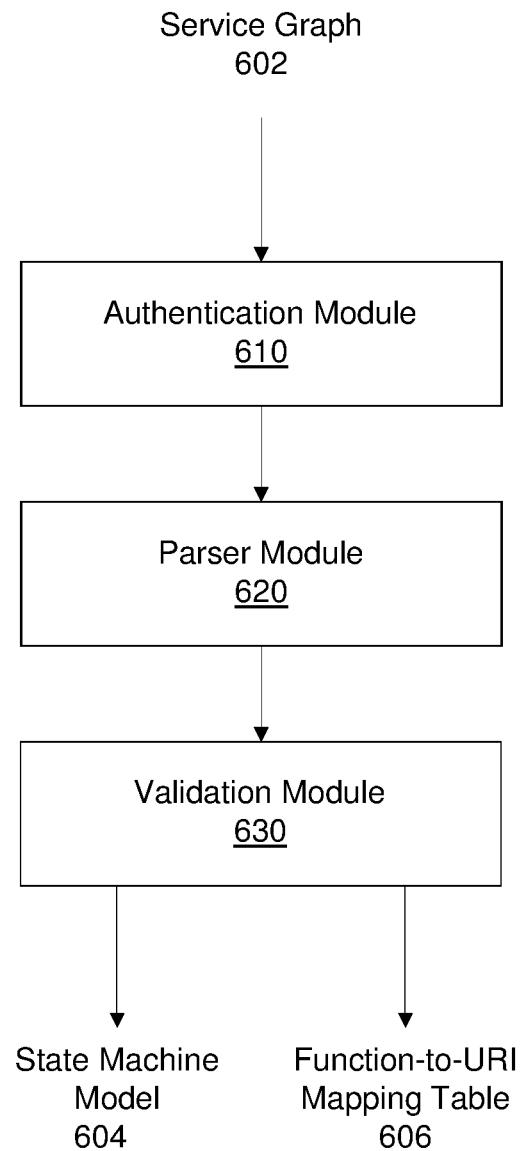
FIG. 6 illustrates additional components of the serverless cloud architecture of FIG. 4A, in accordance with one embodiment.

FIG. 6 illustrates additional components of the serverless cloud architecture 400 of FIG. 4A, in accordance with one embodiment. As discussed above, the service graph engine 420 is configured based on a state machine model as represented by a service graph representation of the state machine model. In one embodiment, the serverless cloud architecture 400 includes an authentication module 610, a parser module 620, and a validation module 630. Users may create service graphs 602 that represent state machine models using a service graph language. In one embodiment, the service graph language is a JSON representation of a service graph. In another embodiment, the service graph language is a proprietary language defined in a service graph language specification.

A user may submit a service graph 602 to a cloud service that enables a user to create state machine models for executing cloud-based functions in the serverless cloud architecture 400. In one embodiment, the user stores the service graph 602 as a file and submits the file in a request transmitted to the cloud service. The file containing the service graph 602 may be processed by an authentication module 610. The authentication module 610 is configured to allow only authorized users to create new service graphs 602 or modify existing service graphs 602. The authentication module 610 may utilize usernames and passwords to authenticate specific users and ensure that the submitted service graph corresponds to a particular authorized user. Once the service graph 602 has been authenticated, the service graph 602 is passed to the parser module 620.

The parser module 620 is configured to parse the file, which may be received in an ASCII text format or the like, to determine the state machine model represented by the service graph 602. In one embodiment, the parser module 620 parses the service graph syntax to determine the structure of the state machine model represented by the service graph 602. As each object (i.e., state, action, event, and/or result) is read from the file, the objects may be passed to the validation module 630. The validation module 630 may be configured to provide programming syntax validation of the parsed service graph objects. In other words, the validation module 630 is configured to determine whether each object specified in the file for the service graph 602 conforms to the proper syntax as defined in a service graph language specification. The validation module 630 may also validate any functions/event referenced in the service graph 602. For example, the validation module 630 may check for the existence of any functions in the function execution engine 410 referenced by a function name in the service graph 602. The validation module 630 may also check with the SG manager 430 for the existence of an event source 440 associated with any events reference by an event name in the service graph 602.

Once the syntax and availability of functions and events have been confirmed by the validation module 630, the validation module 630 may output a state machine model specification 604 and a function-to-URI mapping table 606. Again, the state machine model specification 604 is a definition of the state machine model represented by the service graph 602 and is passed as an input when instantiating instances of the SMIs 426 to implement the state machine model. The function-to-URI mapping table 606 maps specific function names (i.e., actions) to a unique URI for the cloud-based function corresponding with the function name such that the SMI 426 can generate a request transmitted to the function execution engine 410 using the URI for the function in the mapping table 606.

Figure 7:
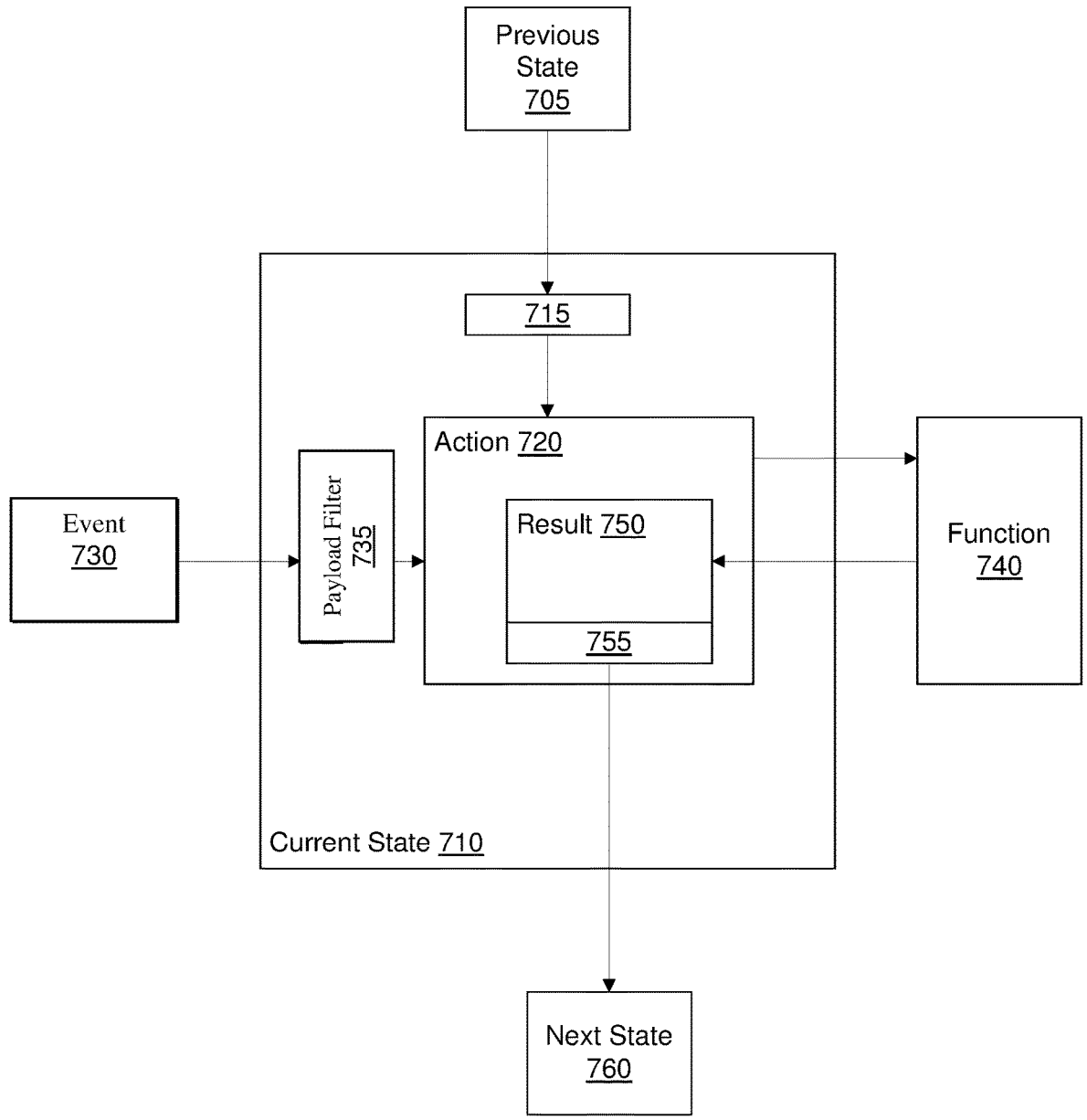
FIG. 7 illustrates the operation of the state machine model implemented by a state machine instance, in accordance with one embodiment.

FIG. 7 illustrates the operation of the state machine model implemented by a state machine instance, in accordance with one embodiment. A service graph can be viewed as a collection of states and the transitions between those states. Each state may trigger one or more actions in response to one or more events. FIG. 7 is a conceptual diagram of the operations associated with entering a current state 710 in the state machine model implemented by an SMI 426.

As shown in FIG. 7, the state machine model transitions from a previous state 705 to the current state 710. The previous state 705 transmits a payload as an input to the current state. The payload includes data to be processed by one or more cloud-hosted functions. In one embodiment, the payload is Javascipt Object Notation (JSON) formatted data. The current state 710 may include a user-defined payload filter 715, which processes the payload received from the previous state 705. The payload filter 715 may include instructions to filter the input prior to the input being provided as input to the cloud-hosted functions. It will be appreciated that the payload filter 715 is optional and that the payload does not need to be processed before being passed to an action 720.

The action 720 defines how the filtered payload is to be processed. The execution of the action 720 may be delayed by one or more events 730. Again, an event mapping agent 442 monitors event sources 440 and notifies the SGC 424 when an event occurs. In one embodiment, the event mapping agent 442 transmits an event payload to the SGC 424, which may comprise JSON formatted data related to the event. For example, if the event is a file event, then the event payload may include JSON formatted metadata associated with the file, the file contents, and the like. If the event is a database table event, then the event payload may include JSON formatted data for an entry in the table. If the event is a protocol event, then the event payload may include JSON formatted protocol data such as an HTTP method and a URI associated with the method.

The event payload may be processed by a payload filter 735, which can process the event payload data prior to the event payload data being passed to the action 720. Once the event conditions have been satisfied, the action 720 is processed. In one embodiment, the action 720 includes invoking a function call for a cloud-hosted function. The payload may be passed to the function 740 as an input. The function 740 may be a cloud-hosted function executed by the function execution engine 410. The result of the function 740 is returned as a result payload. The result payload is JSON formatted data returned by the function. The result payload may be received by a result action 750 in the state. The result action 750 may trigger another action (i.e., nested action), which can be delayed based on one or more additional events, or may trigger the transition from the current state 710 to the next state 760. The result payload may also be filtered by a payload filter 755, prior to the result payload being transferred to the next state 760.

Figure 8:
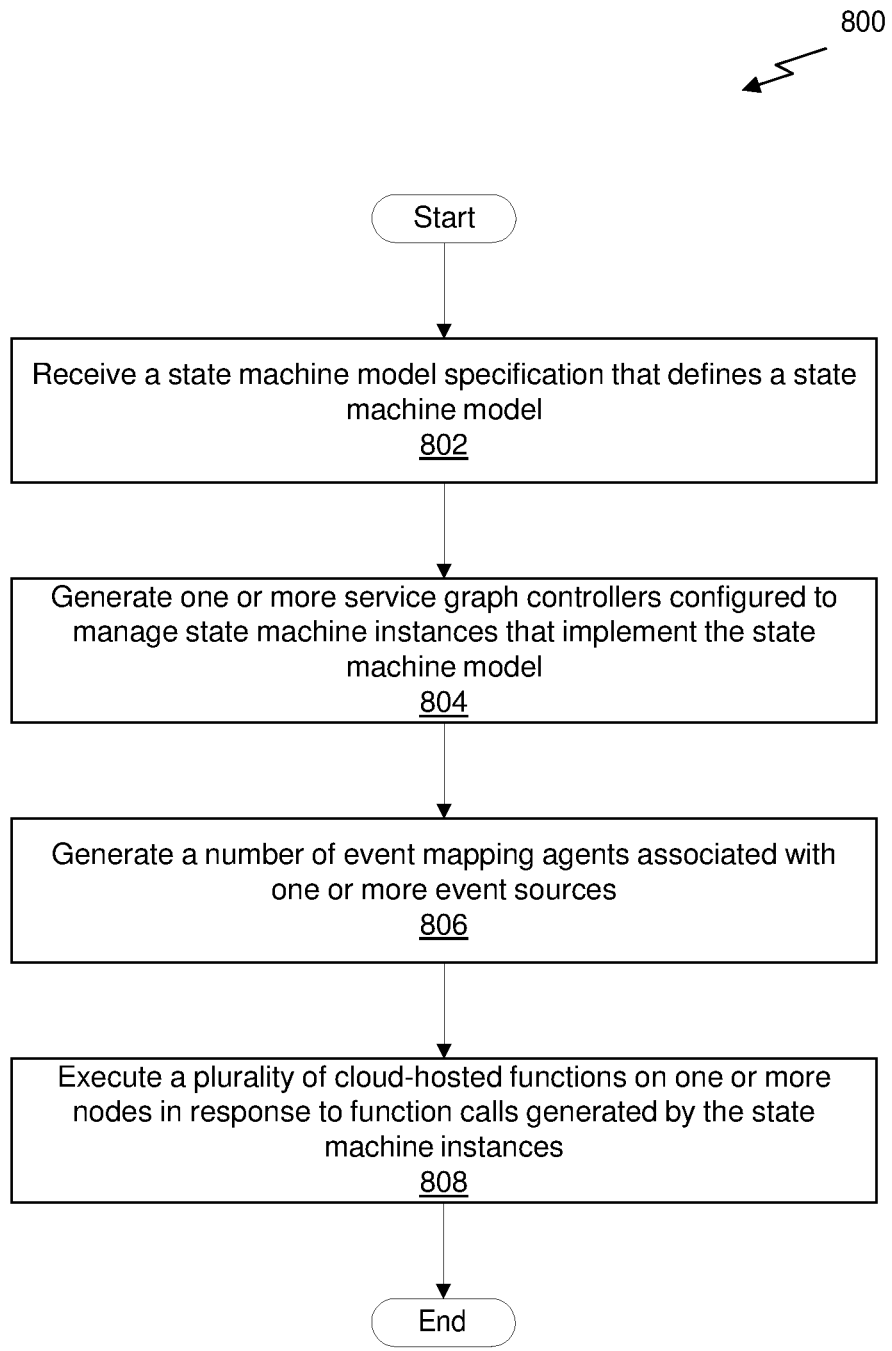
FIG. 8 is a flowchart of a method for executing cloud-hosted functions in a serverless cloud architecture, in accordance with one embodiment.

FIG. 8 is a flowchart of a method 800 for executing cloud-hosted functions in a serverless cloud architecture, in accordance with one embodiment. The method 800 may be performed by hardware, software, or a combination of hardware and software. In one embodiment, the method 800 is implemented, at least in part, by the SG manager 430 of a serverless cloud architecture 400.

At step 802, a state machine model specification is received that defines a state machine model. The state machine model specification comprises a file that includes a definition of a state machine model according to an application programming interface that defines the components and syntax for defining the structure of a state machine model. In one embodiment, the SG manager 430 reads the state machine model specification from a database that stores a plurality of state machine model specifications as defined by one or more users.

At step 804, one or more service graph controllers (SGCs) configured to manage state machine instances (SMIs) that implement the state machine model are generated. In one embodiment, the SG manager 430 creates at least one SGC 424 in a memory of a node of the cloud. Multiple SGCs 424 may be deployed on multiple nodes in the cloud to load balance different instantiations of the service graph by various client machines. Each SGC 424 may create one or more associated SMIs 426 to implement the state machine model.

At step 806, a number of event mapping agents associated with one or more event sources are generated. In one embodiment, the SG manager 430 generates an event mapping agent 442 for each of one or more event sources 440. Each event mapping agent 442 is configured to track events generated at the event sources 440 and transmit notifications of the events to one or more SGCs 424. The number of event mapping agents 442 may be determined based on the number of event sources referenced in the state machine model.

At step 808, a plurality of cloud-hosted functions are executed on one or more nodes in response to function calls generated by the state machine instances. In one embodiment, the SMIs 426 are executed and transition through the states of the state machine model in response to the events monitored by the event mapping agents 442. The SMIs 426 issue function calls invoked as part of the actions of one or more states, which call the cloud-hosted functions executed by a function execution engine 410.

Figure 9:
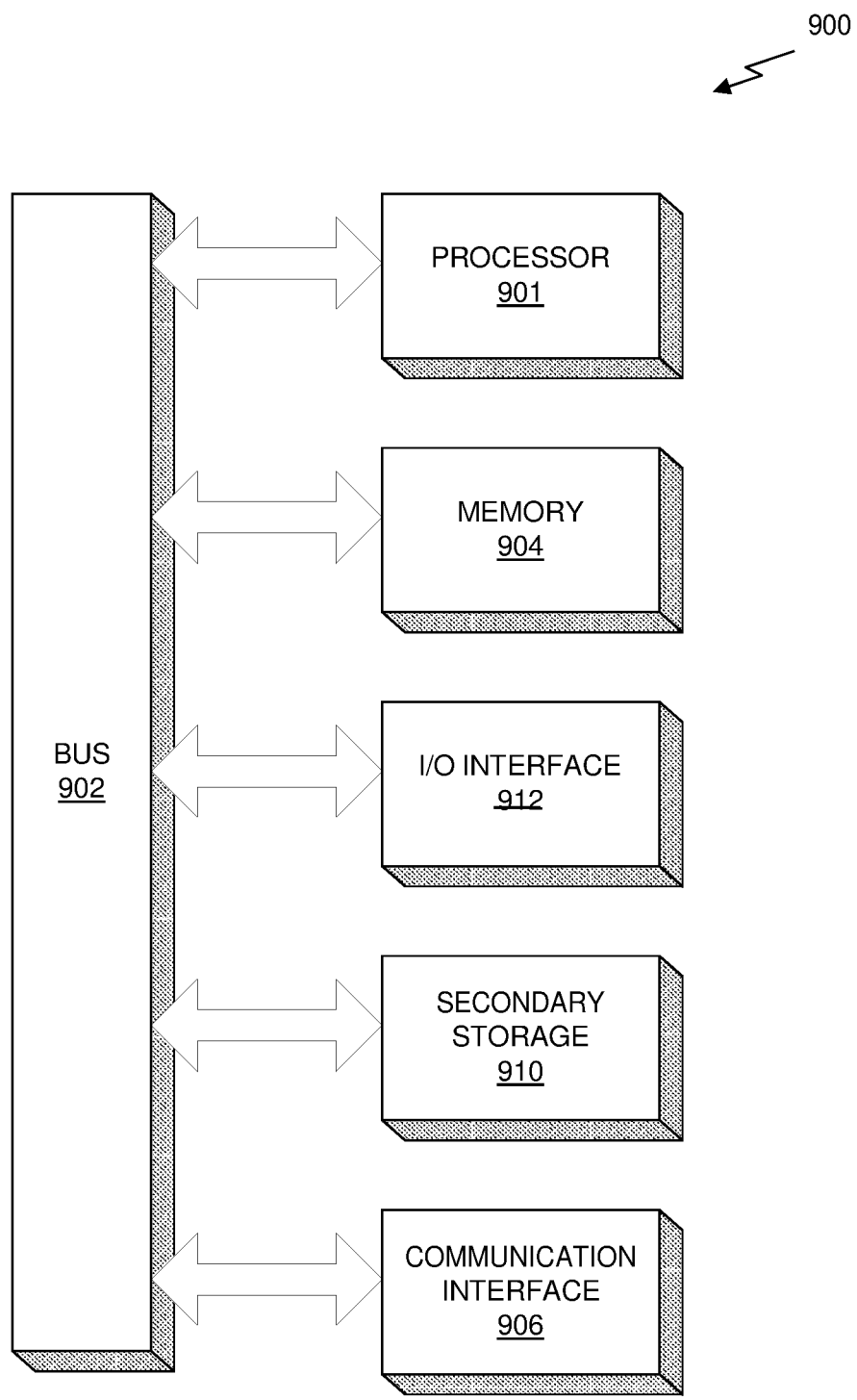
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one processor 901 that is connected to a communication bus 902. The communication bus 902 may be implemented using any suitable protocol, such as PCI (Peripheral Component Interconnect), PCI-Express, AGP (Accelerated Graphics Port), Hyper-Transport, or any other bus or point-to-point communication protocol(s). The system 900 also includes a memory 904. Control logic (software) and data are stored in the memory 904 which may take the form of random access memory (RAM).

The system 900 also includes an input/output (I/O) interface 912 and a communication interface 906. User input may be received from the input devices 912, e.g., keyboard, mouse, touchpad, microphone, and the like. In one embodiment, the communication interface 906 may be coupled to a graphics processor (not shown) that includes a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the processor 901, a graphics processor coupled to communication interface 906, an integrated circuit (not shown) that is capable of at least a portion of the capabilities of both the processor 901 and a graphics processor, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A serverless cloud architecture, comprising:
a service graph manager configured to perform operations comprising:
receiving a state machine model specification that defines a state machine model that transitions in response to events, a representation of the state machine model being based on a service graph language, the state machine model comprising states, actions, and events defined in a hierarchical structure;
generating one or more service graph controllers (SGCs) configured to manage state machine instances (SMIs) that implement the state machine model and generate function calls; and
generating a number of event mapping agents associated with one or more event sources, wherein each event mapping agent is configured to track events generated at the event sources and to transmit notification of the events to the one or more SGCs to trigger actions of one or more SMIs; and
a function execution engine configured to execute a plurality of cloud-hosted functions on one or more nodes in response to the function calls generated by the SMIs, the actions including invoking a function call of a cloud-hosted function executed by the function execution engine.

2. The serverless cloud architecture of claim 1, wherein the events include at least one of file events, table events, and protocol events.

3. The serverless cloud architecture of claim 1, wherein the service graph language comprises a javascript object notation (JSON) representation of the state machine model.

4. The serverless cloud architecture of claim 1, wherein the service graph manager is configured to generate a service graph engine corresponding to a particular service graph, the service graph engine comprising:
- the one or more SGCs;
- a service graph scheduler in communication with the one or more SGCs; and
- one or more SMIs associated with each SGC in the one or more SGCs.

5. The serverless cloud architecture of claim 4, wherein each SGC in the one or more SGCs is hosted on a different node in a plurality of nodes, each node hosting one SGC and one or more SMIs associated with the SGC.

6. The serverless cloud architecture of claim 4, wherein the SG manager is configured to perform load balancing by adjusting a number of the one or more SGCs.

7. A method for executing cloud-hosted functions in a serverless cloud architecture, the method comprising:
- receiving, at a service graph manager, a state machine model specification that defines a state machine model that transitions in response to events, a representation of the state machine model being based on a service graph language, the state machine model comprising states, actions, and events defined in a hierarchical structure;
- generating one or more service graph controllers (SGCs) configured to manage state machine instances (SMIs) that implement the state machine model and generate function calls;
- generating a number of event mapping agents associated with one or more event sources, wherein each event mapping agent is configured to track events generated at the event sources and to transmit notification of the events to the one or more SGCs to trigger actions of one or more SMIs; and
- executing a plurality of cloud-hosted functions on one or more nodes in response to the function calls generated by the SMIs, the actions including invoking a function call of a cloud-hosted function executed on the one or more nodes.

8. The method of claim 7, wherein the events include at least one of file events, database table events, and protocol events.

9. The method of claim 7, wherein representing the state machine model based on the service graph language comprises providing a javascript object notation (JSON) representation of the state machine model.

10. The method of claim 7, further comprising configuring the service graph manager to generate a service graph engine corresponding to a particular service graph, the generated service graph engine comprising:
- the one or more SGCs;
- a service graph scheduler in communication with the one or more SGCs; and
- one or more SMIs associated with each SGC in the one or more SGCs.

11. The method of claim 10, further comprising hosting each SGC in the one or more SGCs on a different node in a plurality of nodes, each node hosting one SGC and one or more SMIs associated with the SGC.

12. The method of claim 10, further comprising configuring the SG manager to perform load balancing by adjusting a number of the one or more SGCs.

13. A non-transitory computer-readable media storing computer instructions for executing cloud-hosted functions in a serverless cloud architecture that, when executed by one or more processors, cause the one or more processors to perform the steps of:
- receiving, at a service graph manager, a state machine model specification that defines a state machine model that transitions in response to events, a representation of the state machine model being based on a service graph language, the state machine model comprising states, actions, and events defined in a hierarchical structure;
- generating one or more service graph controllers (SGCs) configured to manage state machine instances (SMIs) that implement the state machine model and generate function calls;
- generating a number of event mapping agents associated with one or more event sources, wherein each event mapping agent is configured to track events generated at the event sources and to transmit notification of the events to the one or more SGCs to trigger actions of one or more SMIs; and
- executing a plurality of cloud-hosted functions on one or more nodes in response to the function calls generated by the SMIs, the actions including invoking a function call of a cloud-hosted function executed on the one or more nodes.

14. The non-transitory computer-readable media of claim 13, wherein the steps further comprise configuring the service graph manager to generate a service graph engine corresponding to a particular service graph, the generated service graph engine comprising:
- the one or more SGCs;
- a service graph scheduler in communication with the one or more SGCs; and
- one or more SMIs associated with each SGC in the one or more SGCs.

15. The non-transitory computer-readable media of claim 14, wherein the steps further comprise hosting each SGC in the one or more SGCs on a different node in a plurality of nodes, each node hosting one SGC and one or more SMIs associated with the SGC.

* * * * *